United States Patent [19]

Baass

[11] 4,334,499

[45] Jun. 15, 1982

[54] ARTIFICIAL REEF CONSTRUCTION

[76] Inventor: Allen J. Baass, Rt. 3, Box 60-B, Victoria, Tex. 77901

[21] Appl. No.: 208,144

[22] Filed: Nov. 19, 1980

[51] Int. Cl.³ ............................................. A01K 61/00
[52] U.S. Cl. ....................................................... 119/3
[58] Field of Search ...................... 119/2, 3, 4; 405/30; 272/113

[56] References Cited

U.S. PATENT DOCUMENTS

| 611,199 | 9/1898 | Hendryx | 119/4 |
|---|---|---|---|
| 3,928,701 | 12/1975 | Roehner | 272/113 X |
| 4,080,793 | 3/1978 | Pulsifer | 405/30 |
| 4,188,153 | 2/1980 | Taylor | 405/30 X |
| 4,196,694 | 4/1980 | Buchanan | 119/3 |

FOREIGN PATENT DOCUMENTS 2303119 10/1976 France ................................. 405/30

*Primary Examiner*—Gene Mancene
*Assistant Examiner*—Robert P. Swiatek
*Attorney, Agent, or Firm*—Gunn, Lee & Jackson

[57] ABSTRACT

An artificial reef construction is provided, having a base portion formed by a discarded inflatable rubber vehicle tire which is adapted to lie on one side wall thereof with one of the rim openings facing upwardly. The vehicle tire is at least partially filled with weighting material such as concrete. A plurality of strands of wire rope extend through apertures formed in the upper side wall of the vehicle tire, adjacent the upper rim opening with the lower portions of each of the sections of wire rope being embedded in the weighting material for retention. The sections of wire rope extending above the vehicle tire are then frayed so as to form upwardly diverging multiple wire rope strands that cooperate with the vehicle tire to define a centrally oriented protective nesting environment for marine life.

11 Claims, 5 Drawing Figures

ARTIFICIAL REEF CONSTRUCTION

FIELD OF THE INVENTION

This invention relates generally to the development of artificial reefs for the purpose of enhancing the development of marine life. More specifically, the present invention concerns the provision of an artificial reef construction employing materials that would otherwise be discarded together with other materials of relatively low cost.

BACKGROUND OF THE INVENTION

It is well known that preservation and development of marine life is materially enhanced through the provision of artificial reef structures at the bottom of bodies of water. Artificial reefs provide a protective habitat for smaller marine animal life and also provide structures on which marine vegetation is enabled to grow. Marine animal life is attracted to the vegetation and is also attracted to the protective environment that is offered by various artificial reef structures. It is also well known that certain fish prefer relatively hard and rocky surfaces on which to construct a nest and raise their young. In many parts of the world, the various bodies of water found have soft bottoms, formed of mud or other sedimentary deposits and therefore offer a relatively poor environment for nesting fish. It is desirable, therefore, to provide an artificial reef construction that presents a relatively hard and rocky surface which will facilitate optimum nesting areas for certain kinds of marine animal life.

Because of the desirability to provide artificial reefs of relatively low cost, it is desirable to utilize materials for reef construction which would otherwise be discarded.

DESCRIPTION OF THE PRIOR ART

One type of refuse material that is readily available for artificial reef construction is defined by discarded inflatable rubber vehicle tires. Many attempts have been made to utilize vehicle tires in the manufacture of other products simply because of their ready availability. It is typically necessary to reduce the vehicle tires to a granulated form which requires expensive machines and expensive manufacturing costs. Moreover, with the recent development of steel belted radial tires, it is practically impossible to provide machines having the capability of separating the rubber and steel or otherwise preparing it for use in a subsequent manufacturing operation.

From the standpoint of artificial reefs, vehicle tires are commonly used as is evident from U.S. Pat. No. 4,057,141 where groups of tires are compressed into bales and then appropriately cut so as to define an effective habitat for fish and other marine life. Other artificial habitats for marine life are disclosed by U.S. Pat. Nos. 3,933,124; 3,929,100; and 3,191,386.

SUMMARY OF THE INVENTION

It is a primary feature of this invention to provide a novel artificial reef construction making effective use of materials that might otherwise be discarded.

It is also a feature of this invention to provide a novel artificial reef construction which is so constructed that it will settle within a body of water and become properly oriented as it reaches the bottom of the body of water.

It is another feature of this invention to provide a novel artificial reef construction which develops a rocky and protected nesting area for certain types of marine life.

Among the several features of this invention is contemplated the provision of an artificial reef construction employing discarded inflatable rubber vehicle tires and cable which are retained in assembly by a low cost weighting material such as concrete.

It is also a feature of this invention to provide a novel method for manufacturing artificial reef constructions which further enhances the effective and low cost nature of the resulting product.

Other and further objects, advantages and features of the invention will become obvious to one skilled in the art upon an understanding of the illustrative embodiment about to be described, and various advantages, not referred to herein, will occur to one skilled in the art upon employment of the invention in practice.

Briefly, the present invention concerns an artificial reef construction that is adapted to rest on the bottom of a body of water and to provide a centrally oriented rocky surface that is defined within a base structure. A plurality of wire strands are interconnected with the base structure and extend upwardly in diverging manner. The wire strands are positioned in spaced relation about the centrally oriented rocky nesting surface and thereby provide an effective, protected habitat for marine animal life as well as a structure for growth of marine plant life. The artificial construction is defined by a base structure comprising a discarded inflatable rubber vehicle tire that is adapted to lie on one of its side walls with the opposite side wall thereof facing upwardly and with the rim opening of the upwardly directed side wall positioned in substantially parallel relation with the bottom of the body of water. The vehicle tire is at least partially filled with a weighting material such as concrete which also provides a hard and rocky surface that is conducive to nesting for certain types of fish and other marine animal life. A plurality of wire rope sections are extended through apertures formed in the upper side wall of the vehicle tire, which apertures are positioned in spaced relation about the rim opening of the upper side wall. The sections of wire rope extend through the apertures into the weighting material, thereby causing the weighting material to serve also for retention of the wire rope sections in assembly with the base structure of the artificial reef. If desired, the lower ends of the wire rope may be positioned within the lower rim opening of the vehicle tire so as to orient each section of wire rope in upwardly diverging relation. The upper portions of each of the sections of wire rope are frayed outwardly so as to form upwardly diverging multiple wire strands with the strands of each section cooperating so as to define a centrally oriented protected nesting habitat immediately above the central portion of the rocky surface defined by the weighting material.

This invention is also directed to a method for manufacture of artificial reef constructions which method involves initial forming of a plurality of apertures in one side wall of a discarded vehicle tire, which apertures may be oriented immediately about the reinforced rim opening of the side wall. The vehicle tire is then placed on one of its side walls with the apertures in the opposite side wall directed upwardly. A pair of substantially identical lengths of wire rope are then formed to define loops and the opposite ends of each length of wire rope are then inserted through opposed apertures with the ends being positioned within the lower rim opening of the vehicle tire. Such positioning causes each end portion of the length of cable to be positioned in outwardly diverging relation. After both lengths of wire rope have been inserted into proper position with respect to the vehicle tire, the tire is then at least partially filled with a weighting material such as concrete, and the weighting material is allowed to harden into a structural mass that surrounds the ends of the wire rope and thus retains the wire rope in assembly with the vehicle tire and weighting material. After hardening of the weighting material, the wire rope lengths are then cut at the upper central portions thereof, thus defining four upwardly and outwardly diverging sections of wire rope with the lower extremities thereof in positive assembly with the base structure of the artificial reef construction. The upper portions of the wire rope are then unwound or frayed so as to define upwardly diverging strands of wire rope with the strands cooperating to define protective structure about the centrally oriented nesting habitat defined within the upper rim opening of the vehicle tire.

BRIEF DESCRIPTION OF THE DRAWINGS

In order that the manner in which the above-recited advantages and objects of the invention are attained, as well as others, which will become apparent, can be understood in detail, more particular description of the invention, briefly summarized above, may be had by reference to the specific embodiments thereof that are illustrated in the appended drawings, which drawings form a part of this specification. It is to be understood, however, that the appended drawings illustrate only typical embodiments of the invention and therefore are not to be considered limiting of its scope, for the invention may admit to other equally effective embodiments.

In the Drawings

DETAILED DESCRIPTION OF PREFERRED EMBODIMENT

Figure 1:
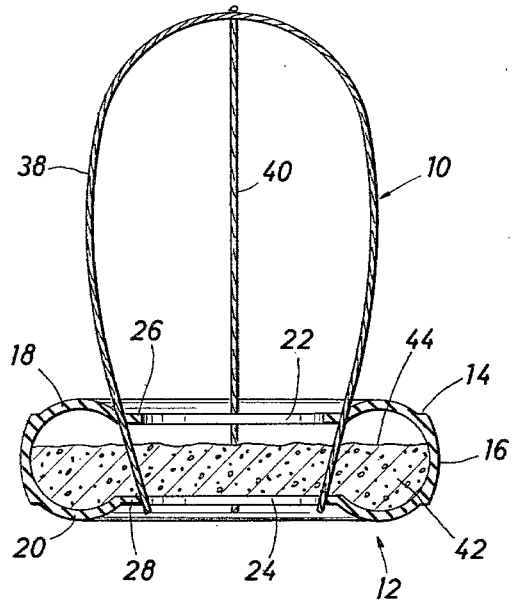
FIG. 1 is a sectional view of an artificial reef construction manufactured in accordance with the present invention and showing the sections of wire rope thereof prior to cutting.

Referring now to the drawings and first to FIG. 1, an artificial reef construction manufactured in accordance with this invention is illustrated generally at 10 and includes a base portion illustrated generally at 12 which is partially defined by a discarded inflatable rubber vehicle tire 14 having a circular tread 16 and side walls 18 and 20. For purposes of this invention, side wall 18 will be referred to as the upper side wall while side wall 20 is referred to as the lower side wall. The upper and lower side walls 18 and 20 define upper and lower rim openings 22 and 24 that are surrounded by reinforced rim seal structures 26 and 28.

The upper side wall 18 of the vehicle tire 14 is formed to define a plurality of apertures 30, 32, 34 and 36 which are positioned in the immediate vicinity of the upper reinforced rim seal portion 26 of the vehicle tire. These apertures are oriented in spaced relation about the rim seal portion 26 and are provided in opposed pairs. Obviously, any suitable number of apertures may be provided without departing from the spirit and scope of the present invention.

Discarded wire rope is then obtained and is cut into suitable lengths for use in accordance with the present invention. Each of these lengths of wire rope is then formed to define a loop as shown at 38 and 40 and the ends of each length of wire rope are inserted through respective opposed pairs of apertures and extended into the vehicle tire 14 in the manner illustrated in FIG. 1. The ends of the length of wire rope may be positioned within the lower rim opening 22 of the vehicle tire in the manner shown in FIG. 1, thus causing the opposed sides of the lengths of wire rope to be positioned in upwardly diverging manner.

Figure 2:
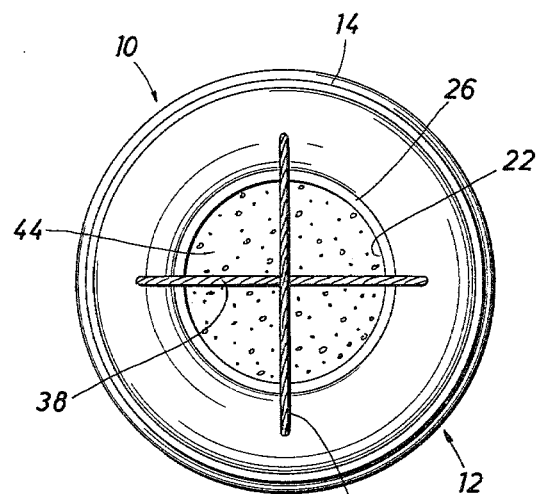
FIG. 2 is a plan view of the artificial reef construction of FIG. 1, also prior to cutting of the lengths of wire rope.
Figure 3:
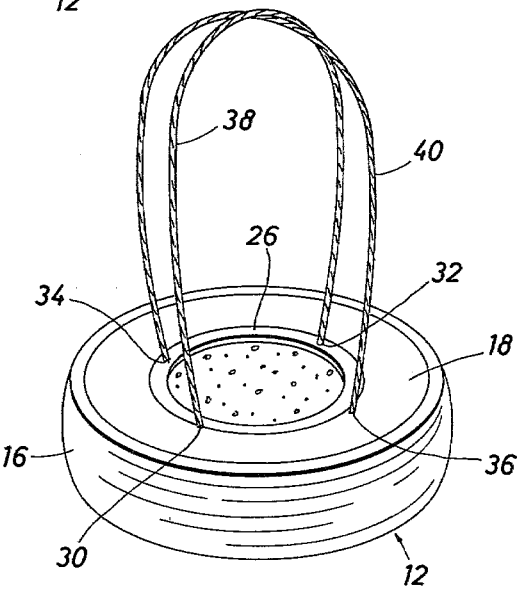
FIG. 3 is an isometric view of the artificial reef construction illustrated in FIGS. 1 and 2.

With the lengths of wire rope positioned in the manner illustrated in FIGS. 1-3, a suitable quantity of weighting material such as concrete is then poured into the vehicle tire through the upper rim opening 22. If desired, the lower rim opening 24 may be suitably closed, thus preventing the weighting material from flowing through the lower rim opening. Also, if desired, the lower rim opening 24 may be left open, thereby allowing weighting material to flow through rim opening 24 and fill the space defined by the cooperative relationship of the vehicle tire with any suitable flat surface on which the vehicle tire may be positioned during pouring of the weighting material. The weighting material 42 or concrete flows about the lower ends of the wire rope such as illustrated in FIG. 1 and, upon hardening, defines a rigid retainer mass that functions also to retain the length of cable in positive permanent assembly with the vehicle tire structure. The weighting material 42, when fully cured, defines a hard, substantially flat, rocky surface 44 which may, if desired, be located below the level of the upper rim opening 22 as shown in FIG. 1, thus defining an annular protective chamber or marine habitat immediately surrounding the rim opening 22. If desired, the surface 44 may be defined by variable size gravel that is spread onto the concrete and partially embedded therein during the manufacturing process. This gravel will define multiple crevices and interstices that enhance the protective environment for smaller marine life such as fish eggs, fry, etc.

Figure 4:
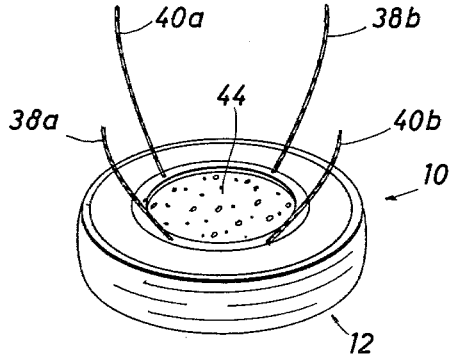
FIG. 4 is an isometric view similar to that of FIG. 3 and illustrating the plural sections of wire rope that are developed by cutting.
Figure 5:
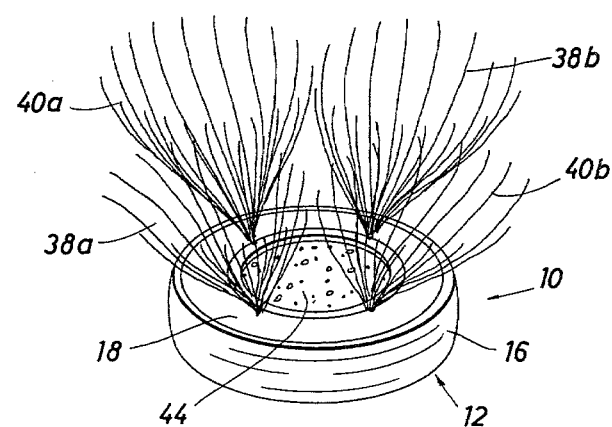
FIG. 5 is an isometric view similar to that of FIGS. 3 and 4 and illustrating the condition of the lengths of wire rope after having been unwound and frayed, thus completing the artificial reef construction.

With the artificial reef construction manufactured in accordance with FIGS. 1, 2 and 3, it may be lifted and handled in any suitable manner with minimal hazard to workmen handling the same. For example, a lifting device such as the hook of a crane may be attached to the upstanding loops of wire rope and the artificial reef device may be lifted such as for loading onto transportation vehicles for transportation of the same to the ultimate site for use. Obviously, depending upon the manufacturing process, manufacturing may be completed at the manufacturing site or at the ultimate site for use. As shown in FIG. 4, the loops of wire rope 38 and 40 are cut at the upper portion thereof so as to define a plurality of upstanding sections of wire rope such as shown at 38a and b and 40a and b. After the cutting operation has been accomplished, the upstanding sections of wire rope are then unwound or frayed so as to define upstanding, outwardly inclined, diverging wire strands such as shown at FIG. 5. These frayed strands of wire rope cooperate with the base structure 12 of the artificial reef construction so as to define a centrally oriented protected nesting area for fish and other forms of marine life. Thus, larger predator fish, which might otherwise consume the developing marine life, will be prevented from easily entering the nesting chamber defined by the interacting strands of wire rope and the relationship thereof to the vehicle tire and centrally oriented rim opening.

For ultimate protection of the workmen involved, the artificial reef structures may be transported to the ultimate site for use in the form illustrated in FIGS. 1-3, and, immediately prior to use, the loops 38 and 40 of wire rope may be cut in the manner shown in FIG. 4. The workmen then may manually unwind and fray the upstanding sections of wire rope to the form illustrated in FIG. 5 and the resulting reef structures then may be dropped into the body of water. The weighting material or concrete will cause the vehicle tire 14 to settle with the lower side wall structure 20 and lower rim opening 24 positioned in the manner shown in FIGS. 1-5. The artificial reef construction 10 will therefore settle onto the bottom of the body of water with the upstanding wire rope strands directed upwardly in the manner shown in FIG. 5. Fish or any other marine life that prefer a hard and rocky surface for the purpose of nesting will be enabled to enter the centrally oriented nesting area defined by the reef structure. The resulting eggs and fry from the nesting function of fish will be enabled to be protected by the annular chamber that surrounds the upper rim opening 22 and is located above the surface 44 of the weighting material 42. As the fry develop, the upstanding wire strands will offer further protection against destruction by the various predator life that might otherwise readily consume them.

It is therefore apparent that I have provided a novel artificial reef construction that accomplishes all of the features hereinabove set forth together with other features that are inherent in the structure of the invention itself. Having thus described my invention in detail,

I claim:

1. An artificial reef construction, comprising:
    a discarded inflatable rubber vehicle tire which, when lying on its side, defines a circular upper side wall and a circular lower side wall, each surrounding respective upper and lower rim openings;
    a quantity of concrete being disposed within said rubber vehicle tire, said vehicle tire and said concrete cooperating to define a base structure; and
    a plurality of lengths of multistrand wire rope having end portions thereof extending through said upper side wall of said vehicle tire and embedded within and retained by said concrete, said lengths of wire rope protruding upwardly from said base structure forming upper portions and cooperating with said base structure to define a centrally oriented protective habitat for marine life.

2. An artificial reef construction as recited in claim 1, wherein:
    said concrete is poured within said vehicle tire in an uncured state with said lengths of wire rope positioned by said vehicle tire and is allowed to harden therein.

3. An artificial reef construction as recited in claim 1, wherein:
    said upper portions of each of said lengths of wire rope being frayed to define a plurality of upwardly diverging groups of strands.

4. An artificial reef construction as recited in claim 1, wherein:
    said concrete partially fills said vehicle tire and defines an upper rocky surface disposed in spaced relation with the upper side wall of said vehicle tire that cooperates with the inner surfaces of said vehicle tire to define an internal protective chamber about said upper rim opening.

5. An artificial reef construction as recited in claim 1, wherein:
    the upper portions of each of said lengths of wire rope being frayed to define a plurality of upwardly diverging groups of strands that cooperate with one another and with said base structure to define a centrally located nesting habitat for fish and other marine life.

6. An artificial reef construction as recited in claim 5, wherein:
    the lower portions of each of said lengths of wire rope are positioned within said lower rim opening of said vehicle tire.

7. An artificial reef construction comprising:
    a discarded inflatable rubber vehicle tire which, when lying on its side, defines a circular upper side wall and a circular lower side wall, each surrounding respective upper and lower rim openings;
    a quantity of concrete being disposed within said rubber vehicle tire, said vehicle tire and said concrete cooperating to define a base structure, said concrete being poured within said vehicle tire in an uncured state and allowed to harden therein; and
    protective strand means protruding upwardly from said base structure and cooperating with said base structure to define a centrally oriented protective habitat for marine life, the lower ends of said strand means extend through said upper side wall and into said concrete and are retained in assembly with said vehicle tire by said concrete.

8. A method of manufacturing an artificial reef, said method comprising:
    forming an inflatable rubber vehicle tire to define a plurality of spaced apertures in one side wall thereof;
    extending the ends of lengths of wire rope through said apertures sufficiently that said ends substantially touch the opposite side wall;
    positioning said vehicle tire on its side with said wire rope extending upwardly;
    pouring uncured weighting material through the upper rim opening into said vehicle tire; and
    allowing said weighting material to harden into a substantially rigid mass, said weighting material retaining said ends of said lengths of wire rope in assembly therewith; and
    fraying said lengths of wire rope into a plurality of upwardly projecting and diverging strands.

9. A method as recited in claim 8, wherein said method includes:
    forming said lengths of wire rope into loops;
    extending the ends of said loops through said apertures in said one side wall; and cutting said loops after curing of said weighting material.

10. A method as recited in claim 9, wherein:
the ends of said loops are positioned within the lower rim opening of said vehicle tire.

11. A method as recited in claim 10, wherein said step of pouring said uncured weighting material comprises: partially filling said vehicle tire with said weighting material thus developing an upper weighting material surface that extends outwardly to the tread portion of said vehicle tire.

* * * * *